(12) United States Patent
Berenguer et al.

(10) Patent No.: US 12,311,623 B2
(45) Date of Patent: May 27, 2025

(54) PLANT FOR BUILDING TYRES FOR VEHICLE WHEELS

(71) Applicant: PIRELLI TYRE S.P.A., Milan (IT)

(72) Inventors: Albert Berenguer, Milan (IT); Christian De Col, Milan (IT); Gianni Enrico Portinari, Milan (IT); Stefano Testi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 18/757,376

(22) Filed: Jun. 27, 2024

(65) Prior Publication Data

US 2024/0343008 A1    Oct. 17, 2024

Related U.S. Application Data

(63) Continuation of application No. 17/628,789, filed as application No. PCT/IB2020/056877 on Jul. 22, 2020, now Pat. No. 12,049,053.

(30) Foreign Application Priority Data

Jul. 23, 2019 (IT) .......................... 102019000012615

(51) Int. Cl.
*B29D 30/00* (2006.01)
*B29D 30/24* (2006.01)
(Continued)

(52) U.S. Cl.
CPC ......... *B29D 30/005* (2013.01); *B29D 30/246* (2013.01); *B29D 2030/0022* (2013.01); *B29D 2030/202* (2013.01); *B29D 30/2607* (2013.01)

(58) Field of Classification Search
CPC .. B29D 30/005; B29D 30/0016; B29D 30/08; B29D 30/10; B29D 30/246;
(Continued)

(56) References Cited

U.S. PATENT DOCUMENTS

| | | | | |
|---|---|---|---|---|
| 2004/0234637 A1* | 11/2004 | Ito | ....................... | B29D 30/005 |
| | | | | 425/34.1 |
| 2006/0169392 A1* | 8/2006 | Akiyama | ............. | B29D 30/005 |
| | | | | 156/111 |

(Continued)

FOREIGN PATENT DOCUMENTS

| | | | | |
|---|---|---|---|---|
| DE | 10260883 B3 * | 7/2004 | .......... | G01M 17/028 |
| WO | WO-2017051267 A1 * | 3/2017 | ............. | B29D 30/10 |

OTHER PUBLICATIONS

Bavendiek K, DE-10260883-B3, machine translation. (Year: 2004).*
Certification Statement + List. Date of Jun. 27, 2024. 1 page.

*Primary Examiner* — Sedef E Paquette
(74) *Attorney, Agent, or Firm* — Steinfl + Bruno LLP

(57) ABSTRACT

A plant for building tyres for vehicle wheels is described. The plant includes a crown structure building for building crown structures on second stage forming drums, a carcass structure building line for building carcass structures on first stage forming drums, a shaping and assembly station, a first manipulator, and a second manipulator. The first manipulator is configured to manage the flow of the second stage forming drums and the second manipulator is configured to manage the flow of the first stage forming terms.

19 Claims, 5 Drawing Sheets

Figure 1:
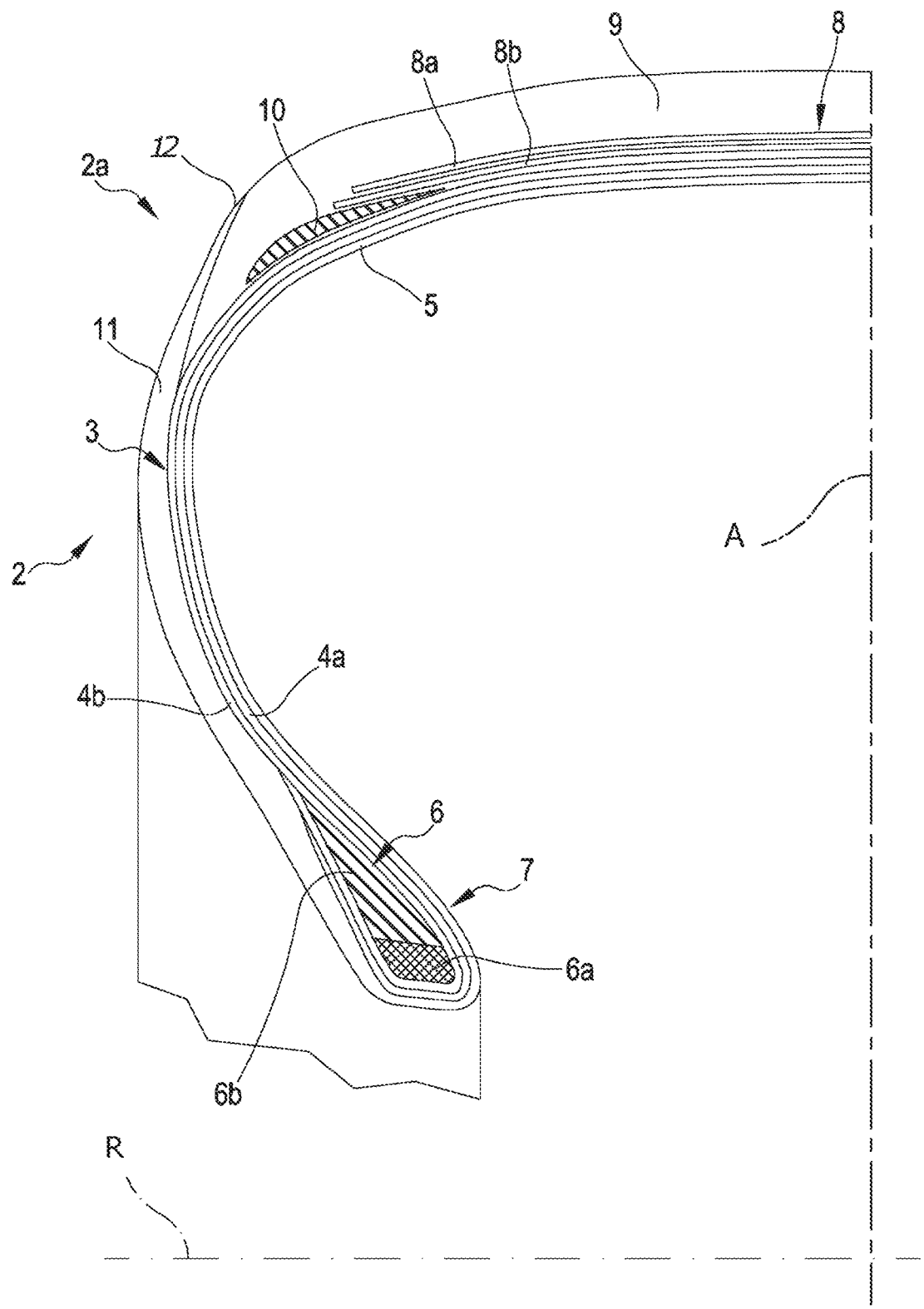

(51) Int. Cl.
*B29D 30/20* (2006.01)
*B29D 30/26* (2006.01)

(58) Field of Classification Search
CPC ............... B29D 30/2607; B29D 30/20; B29D 2030/0022; B29D 2030/0038; B29D 2030/0044; B29D 2030/105; B29D 2030/202; B29D 2030/204
USPC ........................................................ 156/111
See application file for complete search history.

(56) References Cited

U.S. PATENT DOCUMENTS

2010/0024985 A1\* 2/2010 Onimatsu ............ B29D 30/247
156/414
2022/0274361 A1 9/2022 Berenguer et al.

\* cited by examiner

PLANT FOR BUILDING TYRES FOR VEHICLE WHEELS

CROSS-REFERENCE TO RELATED APPLICATIONS

The present application is a continuation of U.S. application Ser. No. 17/628,789 filed on Jan. 20, 2022, which, in turn, is the U.S. National Stage of International Patent Application No. PCT/IB2020/056877 filed on Jul. 22, 2020, which, in turn, claims priority to Italian Patent Application No. 102019000012615 filed on Jul. 23, 2019, the disclosure of each of which is incorporated by reference in its entirety.

The invention relates to a method and a plant for building tyres for vehicle wheels.

A tyre for vehicle wheels typically comprises a carcass structure, shaped according to a substantially toroidal configuration, comprising at least one carcass ply having axially opposite ends. The latter are engaged with respective annular anchoring structures, each of them normally formed from at least one substantially circumferential annular insert called "bead core" on which at least one filling insert is generally applied, tapering radially away from the rotation axis. The annular anchoring structures are located in areas usually identified with the name "beads". The beads have an inner diameter substantially corresponding to a so-called "fitting diameter" of the tyre on a respective mounting rim.

The tyre also comprises a crown structure comprising at least one belt strip located in radially outer position with respect to the carcass ply and a tread band radially outer to the belt strip. Longitudinal and transversal recesses are typically shaped onto the tread band, said recesses being arranged to define a desired tread pattern. Between the tread band and the belt strip(s) it is possible to interpose a so-called "underlayer" made of elastomeric material having properties suitable for obtaining a stable connection of the belt strip(s) with the tread band itself.

The tyre also comprises a pair of so-called sidewalls made of elastomeric material that represent the axially outer surfaces of the tyre, with respect to a middle plane perpendicular to the rotation axis of the same tyre. For example, the sidewalls represent the axially outer surfaces with respect to the annular anchoring structures, to the carcass ply(-ies), to the belt strip(s) and optionally to at least one portion of tread band.

In "tubeless" tyres, there is, in radially inner position with respect to the carcass ply, at least one layer of elastomeric material, usually called "liner", having air-tightness characteristics and generally extending from one bead to the other.

The production cycles of a tyre provide that, after a building process in which the various structural components of the tyre itself are made and/or assembled, the built green tyres are transferred into a molding and vulcanization line where a molding and vulcanization process is carried out that is adapted to define the structure of the tyre according to a desired geometry and tread pattern.

The term "elastomeric material" is meant to indicate a composition comprising at least one elastomeric polymer and at least one reinforcing filler. Such a composition can also comprise additives like, for example, a cross-linking agent and/or a plasticizer. Thanks to the presence of the cross-linking agent, such a material can be cross-linked through heating, so as to form the final manufactured product.

The term "green tyre" is meant to indicate a tyre obtained from the building process and not yet molded and vulcanized.

The term "finished tyre" is meant to indicate a finished tyre obtained from the building process and subsequently molded and vulcanized.

The term "tyre" is meant to indicate a finished tyre or a green tyre.

The terms "axial", "axially", "radial", "radially", "circumferential" and "circumferentially" are used with reference to the tyre or to a drum used in the production process of the tyre.

In particular, the terms "axial" and "axially" are meant to indicate references/magnitudes arranged/measured or extending in a direction substantially parallel to the rotation axis of the tyre or of the drum.

The terms "radial" and "radially" are meant to indicate references/magnitudes arranged/measured or extending in a direction perpendicular to the rotation axis of the tyre or of the drum and lying in a plane comprising such a rotation axis.

The terms "circumferential" and "circumferentially" are meant to indicate references/magnitudes arranged/measured or extending along a circumference that extends around the rotation axis of the tyre or of the drum.

The term "component" or "structural component" of a tyre is meant to indicate any portion thereof capable of performing its own function or a part thereof. Examples of structural components of the tyre are: liner, underliner, anti-abrasive inserts, bead core, bead fillers, carcass ply(-ies), belt strip(s), under-belt layer, underlayer of the tread band, sidewalls, sidewall inserts, tread band, textile or metallic reinforcements, reinforcing elements made of elastomeric material, etc. or a part thereof.

The term "carcass structure" is meant to indicate a sleeve in substantially cylindrical form comprising at least one carcass ply. Generally, the sleeve has axially opposite ends engaged with respective annular anchoring structures adapted to form the beads of the tyre. Preferably, each annular anchoring structure comprises a substantially circumferential annular insert called "bead core" on which at least one filling insert is preferably applied. Preferably, the carcass structure also comprises at least one among: anti-abrasive inserts, liner, underliner, complex, sidewall inserts, reinforcements, underbelt insert.

The term "crown structure" is meant to indicate the assembly formed at least by belt structure (comprising at least one belt strip) and tread band.

The term "tyre being processed" is meant to indicate a tyre in any step of the relative building process that goes from the building of at least one first component constituting the carcass structure and/or the crown structure up to obtaining the finished tyre.

The term "carcass structure being processed" "or crown structure being processed" is meant to indicate a carcass structure or a crown structure in any step of the relative building process that goes from the building of at least one first component constituting the carcass structure or the crown structure up to completely obtaining the carcass structure or crown structure, respectively.

The term "manipulator" is meant to indicate a non-anthropomorphic Cartesian robot adapted to support a forming drum (for example, a first stage drum or a second stage drum) and to move it independently along three Cartesian axes X, Y, Z. Preferably, the manipulator has the ability to rotate the forming drum about at least one axis, more preferably about at least two axes of said Cartesian axes X, Y, Z.

The term "steady state operation" is meant to indicate the normal operating conditions of a tyre building plant, thus excluding possible transitory start-up or stopping periods of the plant itself, for example, linked to a change of production batch.

The term "semi-finished product" is meant to indicate a prefabricated product (in other words manufactured before the production of the tyre and generally outside of the tyre building plant) to form a structural component of a tyre. The manufactured product is prefabricated at full width. In other words, the semi-finished products have their own width pre-sized so as to be equal to the width (measured in an axial direction of the tyre) of the structural component of the tyre that the semi-finished product is adapted to form. The manufactured product can also be prefabricated at full length. In other words, the semi-finished products can have their own length pre-sized so as to be equal to the length (measured in a circumferential direction of the tyre) of the structural component of the tyre that the semi-finished product is adapted to form. The structural component of the tyre is formed through circumferential winding of the semi-finished product on a cylindrical or toroidal deposition surface, transversal cutting to size of the semi-finished product and butt-joining of the ends of the cut semi-finished product. Alternatively, in the case of semi-finished product pre-fabricated at full length, the cutting step is omitted. The pre-fabricated semi-finished product lends itself to be stored (for example on suitable storage reels) to then be used in a tyre production plant. The semi-finished product can be made of only elastomeric material or can be reinforced with at least one cord of textile and/or metallic and/or hybrid material. Generally, the manufactured product has a profile in cross section with a flat shape.

The term "elementary semi-finished product" is meant to indicate a continuous elongated element and/or a ribbon-like element cut to size adapted to be used for the building in situ (inside the tyre building plant) of a structural component of the tyre, at the moment of the building of the tyre itself. Such elementary semi-finished products have their own width smaller than the width (measured in an axial direction of the tyre) of the structural component of the tyre to be built. Such elementary semi-finished products lend themselves to be used in appropriate quantities for building in situ, during the building of the tyre itself, one or more of the structural components of the tyre described above, without requiring the pre-fabrication and the subsequent storage of semi-finished products. In order to build a structural component of a tyre, the elementary semi-finished products are generally deposited on a deposition surface mutually side by side (in other words, one next to the other and/or at least partially radially juxtaposed). It is therefore clear that, whereas it is possible to build a structural component of a tyre simply through deposition and, optionally cutting to size, of a suitable semi-finished product, this is not possible with an elementary semi-finished product that, in order to make a structural component of a tyre, must be deposited side by side and/or juxtaposed over other elementary semi-finished products.

The expression "continuous elongated element" is meant to indicate an elementary semi-finished product having the shape of an elongated manufactured product made of only elastomeric material or comprising at least one cord (of textile and/or metallic material) which extends parallel to the longitudinal extension of the continuous elongated element itself and is incorporated in or at least partially coated by at least one layer of elastomeric material.

The term "strip-like element" is meant to indicate an elementary semi-finished product having the shape of a ribbon-like manufactured product cut to size so as to have its length greater than its width, having a flat profile in cross section and comprising one or more cords generally of textile and/or metallic and/or hybrid material, extending parallel to the length and to the longitudinal extension of the strip-like element itself and incorporated in or at least partially coated by at least one layer of elastomeric material.

The term "technological flexibility" is meant to indicate the possibility of using, for each tyre, semi-finished products/elementary semi-finished products that are different by type of elastomeric material or by type of textile, metallic or hybrid reinforcing cord.

The term "building cycle time" is meant to indicate the time that elapses between the exit of one tyre being processed from a plant and the exit of the next tyre, in steady state operating conditions.

WO 2010/070374 describes a plant for building green tyres for vehicle wheels comprising:
- at least one carcass structure building line on a first forming drum, comprising a plurality of work stations arranged according to a sequential series; and
- at least one first handling device adapted to carry out at least one first movement in which it transfers the first forming drum with the relative carcass structure being processed from any first work station of said sequential series to any other second work station not adjacent to it of said sequential series, so that the first forming drum only passes in said first and second work station during said at least one first movement;
- at least one crown structure building line on at least one second forming drum, comprising a plurality of work stations arranged according to a sequential series; and
- at least one second handling device adapted to carry out at least one first movement in which it transfers the second forming drum with the relative crown structure being processed from any first work station of said sequential series to any other second work station not adjacent to it of said sequential series, so that the second forming drum only passes in said first and second work station during said at least one first movement;
- at least one shaping and assembly station of the tyre being processed adapted to shape said carcass structure on the first forming drum assembling it to said crown structure of the tyre being processed.

WO2012/146988 describes a process for producing tyres comprising:
building a carcass structure on a first stage drum;
building a crown structure;
coupling the crown structure with the carcass structure on the first stage drum or on a shaping drum;
wherein building the crown structure comprises:
forming at least one belt layer on an auxiliary drum to at least partially make a belt structure; transferring the belt structure from the auxiliary drum to a service drum;
forming a tread band through winding of at least one continuous elongated element made of elastomeric material, through formation of coils disposed mutually side by side around the belt structure carried by the service drum.

With respect to the solutions described above, the Applicant has perceived the need to compact the layout and reduce the space occupied by a plant for building tyres, at the same time maintaining a high quality tyre production.

The Applicant has also perceived the need to simplify and decouple the building of tyres from the structural and logistical point of view (in particular with respect to the arrangement of the elements of the building plant), so as to obtain advantages in terms of management of the resources used, accessibility to the work stations, minimization of the building times and investments required.

The Applicant has perceived that the aforementioned needs can be satisfied through a suitable management of the flow of forming drums inside the plant.

More precisely, the Applicant has found that the aforementioned needs can be satisfied through the simultaneous and independent building of N carcass structures on N first stage forming drums and M crown structures on M second stage forming drums, managing such drums with the help of two manipulators to move the N first stage forming drums and the M second stage forming drums between one or more locations of respective building paths/lines, finally passing through a shaping and assembly machine to which the carcass structures and the crown structures are delivered, dissociated from the respective forming drums that terminate the building cycle in predetermined final locations of said building paths/lines.

In accordance with a first aspect thereof, the invention relates to a method for building tyres for vehicle wheels.

Preferably, it is provided to move, in a crown structure building line, M second stage forming drums for building M respective crown structures with M being an integer greater than or equal to 1.

Preferably, said movement in the crown structure building line is carried out along a first path from a first initial location to a first final location, for building a first part of components of the crown structure, comprising at least one belt layer.

Preferably, said movement in the crown structure building line is carried out along a second path from a second initial location to a second final location, passing through a first intermediate location and a second intermediate location, for building a second part of components of the crown structure, comprising at least the tread band.

Preferably, it is provided to move, in a carcass structure building line, N first stage forming drums, for building N respective carcass structures with N being an integer greater than or equal to 1, from a third initial location to a third final location, passing through a third intermediate location.

Preferably, it is provided to manage the flow of said M second stage forming drums, carrying M respective crown structures being processed, entering into the second path of the crown structure building line, with the help of a first manipulator that takes care of transferring the M second stage forming drums, carrying the M respective crown structures being processed, from the second initial location to the first intermediate location of the second path of the crown structure building line. More preferably, for M>1 the first manipulator takes care of transferring the M second stage forming drums in sequence, one at a time.

Preferably, it is provided to manage the flow of said M second stage forming drums arriving into the second intermediate location, carrying the M respective crown structures, with the help of said first manipulator that takes care of:
  delivering the crown structure to a first loading/unloading device associated with a shaping and assembly machine and of
  bringing the respective second stage forming drum into the second final location;

Preferably, it is provided to manage the flow of said N first stage forming drums arriving into the third intermediate location, carrying the N respective carcass structures, with the help of a second manipulator that takes care of:
  delivering the carcass structure to a second loading/unloading device associated with said shaping and assembly machine and of
  bringing the respective first stage forming drum into the third final location.

Preferably, the first loading/unloading device and the second loading/unloading device take care of respectively associating the crown structure and the carcass structure on a shaping drum of the shaping and assembly machine that takes care of carrying out the toroidal shaping of the carcass structure assembling it to the crown structure.

In accordance with a second aspect thereof, the invention relates to a plant for building tyres for vehicle wheels.

Preferably, a crown structure building line is provided to build M crown structures on M second stage forming drums with M being an integer greater than or equal to 1.

Preferably, said crown structure building line comprises a first path, which starts in a first initial location and ends in a first final location, for building a first part of components of the crown structure, comprising at least one belt layer.

Preferably, said crown structure building line comprises a second path, which starts in a second initial location and ends in a second final location, passing through a first intermediate location and a second intermediate location, for building a second part of components of the crown structure, comprising at least the tread band.

Preferably, a carcass structure building line is provided to build N carcass structures on N first stage forming drums with N being an integer greater than or equal to 1, from a third initial location to a third final location, passing through a third intermediate location.

Preferably, a shaping and assembly station is provided comprising a first loading/unloading device, a second loading/unloading device and a shaping and assembly machine with a shaping drum.

Preferably, a first manipulator is provided having a working area inside which the second initial location, the second final location, the first intermediate location and the second intermediate location of the second path of the crown structure building line and the first loading/unloading device are located.

Preferably, a second manipulator is provided having a working area inside which the third final location and the third intermediate location of the carcass structure building line and the second loading/unloading device are located.

Preferably, the first manipulator is configured to transfer the M second stage forming drums, carrying M respective crown structures being processed, from the second initial location to the first intermediate location of the second path of the crown structure building line. More preferably, for M>1 the first manipulator is configured to transfer in sequence, one at a time, the M second stage forming drums from the second initial location to the first intermediate location.

Preferably, the first manipulator is configured to manage the M second stage forming drums arriving into the second intermediate location, carrying the M respective crown structures, delivering the M crown structures to the first loading/unloading device and the respective second stage forming drums to the second final location. More preferably, for M>1 the first manipulator takes care of delivering the M crown structures to the first loading/unloading device in sequence, one a time.

Preferably, the second manipulator is configured to manage the N first stage forming drums arriving into the third intermediate location, carrying the N respective carcass structures, delivering the N carcass structures to the second loading/unloading device and the respective first stage forming drums to the third final location. More preferably, for N>1 the second manipulator takes care of delivering the N carcass structures to the second loading/unloading device in sequence, one at a time.

The provision and the aforementioned use of the two manipulators to manage the aforementioned flows of first and second stage drums, the use of same second stage forming drums in the two crown structure building paths as well as the provision of a shaping and assembly machine that operates with carcass structures and crown structures both dissociated from the respective first and second stage forming drums, make it possible to manage the flow of first and second stage forming drums inside the tyre building plant quickly and in a compact space. Moreover, the division of the building of the crown structures into two distinct paths makes it possible to differentiate the building in the two paths by technology and/or resources used, obtaining high quality tyre production. Moreover, the presence of the two distinct paths makes it possible to arrange dedicated corridors separated by type of resource/technology used and to facilitate the access to the resources as well as the movement and management thereof, for example in the case in which it is necessary to make modifications to produce different sized tyres and/or different structural components.

Overall, the objects outlined above of simplicity of layout and of management of the resources used, minimization of the building times, space occupied and investments required are thus obtained. A compact layout also makes it possible to obtain, in general, better visibility for an operator in charge of supervising the plant.

The present invention in at least one of the aforementioned aspects can have at least one of the following preferred features.

Preferably M and N are integers greater than or equal to 5. More preferably M and N are integers equal to 6.

Preferably, the building of the first part of components of the crown structure is carried out through deposition of semi-finished products.

Preferably, the building of the second part of components of the crown structure is carried out through deposition of elementary semi-finished products.

Preferably, it is provided to move said M second stage forming drums from the first intermediate location to the second intermediate location passing through one or more work stations with the help of one or more transfer devices. Said one or more transfer devices preferably comprises at least one anthropomorphic robot, even more preferably with a robotized arm having at least 6 movement axes.

Preferably, it is provided to move said M second stage forming drums from the first initial location to the second final location passing through one or more work stations with the help of a mobile shuttle.

Preferably, said shuttle is capable of moving, moved by a suitable motor, along suitable guides, preferably in two opposite directions of travel. Said guides are preferably rectilinear.

Preferably, said M second stage forming drums are moved along the first path of the crown structure building line. More preferably, for M>1 said M second stage forming drums are moved in sequence, one at a time, along the first path of the crown structure building line.

Preferably, it is provided to move said N first stage forming drums from the third initial location to the third intermediate location passing through one or more work stations with the help of one or more transfer devices.

Preferably, the movement in the carcass structure building line is carried out along a first path, which starts in said third initial location, for building a first part of components of the carcass structure, comprising at least one carcass ply.

Preferably, the movement in the carcass structure building line is carried out along a second path, which ends in said third final location passing through said third intermediate location, for building a second part of components of the carcass structure, comprising at least one among anti-abrasive insert and portion of sidewalls.

Preferably, the movement in the carcass structure building line comprises the movement of said N first stage forming drums in a bead forming station between the first path and the second path of the carcass structure building line to carry out, on said N first stage forming drums, the engagement of axially opposite ends of the respective carcass structure being processed to respective annular anchoring structures. More preferably, for N>1 it is provided to carry out in sequence, on said N first stage forming drums, the engagement of axially opposite ends of the respective carcass structure being processed to respective annular anchoring structures.

Preferably, the building of the first part of components of the carcass structure is carried out through deposition of semi-finished products.

Preferably, the building of the second part of components of the carcass structure is carried out through deposition of elementary semi-finished products.

Preferably, the semi-finished products used for building the first part of components of the carcass structure are made of elastomeric material reinforced with cords of textile and/or metallic and/or hybrid material. Preferably, said cords are arranged parallel to one another and oriented with a certain angle with respect to the longitudinal extension of the semi-finished product.

Preferably, the semi-finished products used for building the first part of components of the crown structure are made of elastomeric material reinforced with cords of textile and/or metallic and/or hybrid material. Preferably, said cords are arranged parallel to one another and oriented with a certain angle with respect to the longitudinal extension of the semi-finished product.

Preferably, the elementary semi-finished products used for building the second part of components of the carcass structure are made of only elastomeric material.

Preferably, the elementary semi-finished products used for building the second part of components of the crown structure are made of only elastomeric material.

Preferably, the building of the second part of components of the crown structure is carried out through deposition of coils beside one another and/or at least partially radially juxtaposed, of a continuous elongated element on the respective second stage forming drum.

Preferably, the building of the second part of components of the carcass structure is carried out through deposition of coils beside one another and/or at least partially radially juxtaposed, of a continuous elongated element on the respective first stage forming drum.

Preferably, the number N of first stage forming drums is equal to the number M of second stage forming drums.

In an embodiment, the first final location coincides with the first initial location.

In an embodiment, the second final location coincides with the second initial location.

In an embodiment, the second final location coincides with the first initial location.

In an embodiment, the first initial location, the first final location, the second initial location and the second final location coincide.

Preferably, along the first path of the carcass structure building line, said N first stage forming drums are moved between one or more work stations.

Preferably, along the first path of the carcass structure building line, said N first stage forming drums are moved through a mobile shuttle.

Preferably, said shuttle is capable of moving, moved by a suitable motor, along suitable guides, preferably in two opposite directions of travel. More preferably, said guides are rectilinear.

Preferably, said N first stage forming drums are moved along the first path of the carcass structure building line. More preferably, for N>1 it is provided to move in sequence, one at a time, said N first stage forming drums along the first path of the carcass structure building line.

Preferably, along the first path of the carcass structure building line, said N first stage forming drums are each associated with a pair of axially opposite support rings.

Preferably, in the bead forming station and along the second path of the carcass structure building line, said N first stage forming drums are dissociated from said pair of support rings.

Preferably, the building of said N carcass structures on said N first stage forming drums and the building of said M crown structures on said M second stage forming drums are made independently and, preferably asynchronously.

Preferably, the method applies to a steady state operation of a plant for building tyres for vehicle wheels.

Preferably, the second loading/unloading device is configured to receive from the second manipulator the N carcass structures, dissociated from the respective N first stage drums, and associate them with the shaping drum. More preferably, for N>1 the second loading/unloading device is configured to receive from the second manipulator in sequence, one at a time, the N carcass structures, dissociated from the respective N first stage drums, and associate them with the shaping drum.

Preferably, the first loading/unloading device is configured to receive from the first manipulator the M crown structures, dissociated from the respective M second stage forming drums, and associate them with the shaping drum on the respective carcass structure. More preferably, for M>1 the first loading/unloading device is configured to receive from the first manipulator in sequence, one at a time, the M crown structures, dissociated from the respective M second stage forming drums, and associate them with the shaping drum on the respective carcass structure.

Preferably, the shaping and assembly machine is configured to carry out the toroidal shaping of the N carcass structures and the assembly to the M crown structures on the shaping drum. More preferably, for N and M greater than 1, the shaping and assembly machine is configured to carry out in sequence, one at a time, the toroidal shaping of the N carcass structures and the assembly to the M crown structures on the shaping drum.

Preferably, the first manipulator is a non-anthropomorphic Cartesian robot with at least five degrees of freedom to allow the movement of said M second stage forming drums along three Cartesian axes and a rotation about at least two axes of said Cartesian axes. This is in order to allow the rotation of the drum about its rotation axis (coinciding with/parallel to an axis X) and the passage of the drum from a position in which the rotation axis thereof is oriented vertically (parallel to one of the three Cartesian axes, for example to an axis Z) to a position in which the rotation axis thereof is oriented horizontally (parallel to a different one of said three Cartesian axes, for example, parallel to an axis X).

Preferably, the second manipulator is a non-anthropomorphic Cartesian robot with at least five degrees of freedom to allow the movement of said N first stage forming drums along three Cartesian axes and a rotation about at least two axes of said Cartesian axes. This is in order to allow the rotation of the drum about the rotation axis thereof (coinciding with/parallel to an axis X) and the passage of the drum from a position in which the rotation axis thereof is oriented vertically (parallel to one of the three Cartesian axes, for example to an axis Z) to a position in which the rotation axis thereof is oriented horizontally (parallel to a different one of said three Cartesian axes, for example, parallel to an axis X).

Preferably, the first manipulator is configured to pick up the M second stage forming drums from the second initial location and to deliver them to the first intermediate location with rotation axis thereof oriented vertically.

Preferably, the first manipulator is configured to pick up the M second stage forming drums from the second intermediate location with rotation axis thereof oriented vertically.

Preferably, in delivering the M crown structures to the first loading/unloading device, the first manipulator is configured to support the respective second stage forming drums with rotation axis thereof oriented horizontally.

Preferably, in delivering the M second stage forming drums to the second final location, the first manipulator is configured to support the M second stage forming drums with rotation axis thereof oriented vertically.

Preferably, the second manipulator is configured to pick up the N first stage forming drums from the third intermediate location with rotation axis thereof oriented vertically.

Preferably, in delivering the N carcass structures to the second loading/unloading device, the second manipulator is configured to support the respective first stage forming drums with rotation axis thereof oriented horizontally.

Preferably, in delivering the N first stage forming drums to the third final location, the second manipulator is configured to support the N first stage forming drums with rotation axis thereof oriented vertically.

Preferably, the first path of the crown structure building line comprises at least one work station adapted to build the first part of components of the crown structure through deposition of semi-finished products.

Preferably, the second path of the crown structure building line comprises at least one work station adapted to build the second part of components of the crown structure through deposition of elementary semi-finished products.

Preferably, the carcass structure building line comprises a first path, which starts in said third initial location, for building a first part of components of the carcass structure, comprising at least one carcass ply.

Preferably, the carcass structure building line comprises a second path, which ends in said third final location, passing through said third intermediate location, for building a second part of components of the carcass structure, comprising at least one among anti-abrasive insert and portion of sidewalls.

Preferably, the carcass structure building line also comprises a bead forming station between the first path and the second path of the carcass structure building line to carry out on said N first stage forming drums the engagement of axially opposite ends of the respective carcass structure being processed to respective annular anchoring structures.

More preferably, for N>1, the bead forming station is configured to carry out in sequence on said N first stage forming drums the engagement of axially opposite ends of the respective carcass structure being processed to respective annular anchoring structures.

Preferably, the first path of the carcass structure building line comprises at least one work station adapted to build the first part of components of the carcass structure through deposition of semi-finished products.

Preferably, the second path of the carcass structure building line comprises at least one work station adapted to build the second part of components of the carcass structure through deposition of elementary semi-finished products.

Preferably, the plant comprises a first translating support adapted to transfer said M second stage forming drums from said first intermediate location to a first seat of the second path of the crown structure building line, which is located outside of said working area of the first manipulator. More preferably, for M>1, the first translating support is adapted to transfer in sequence, one at a time, said M second stage forming drums from said first intermediate location to said first seat.

Preferably, the plant comprises a second translating support adapted to transfer said M second stage forming drums from a second seat of the second path of the crown structure building line, which is located outside of said working area of the first manipulator, to said second intermediate location. More preferably, for M>1, the second translating support is adapted to transfer in sequence, one at a time, said M second stage forming drums from said second seat to said second intermediate location.

Preferably, the plant comprises a third translating support adapted to transfer said N first stage forming drums from a third seat of the second path of the carcass structure building line, which is located outside of said working area of the second manipulator, to said third intermediate location. More preferably, for N>1, the third translating support is adapted to transfer in sequence, one at a time, said N first stage forming drums from said third seat to said third intermediate location.

Preferably, each of said first and said second translating support is adapted to receive said M second stage drums with rotation axis thereof oriented vertically. More preferably, for M>1, each of said first and said second translating support is adapted to receive in sequence, one at a time, said M second stage drums with rotation axis thereof oriented vertically.

Preferably, said third translating support is adapted to receive said N first stage drums with rotation axis thereof oriented vertically. More preferably, for N>1, said third translating support is adapted to receive in sequence, one at a time, said N first stage drums with rotation axis thereof oriented vertically.

Preferably, the plant comprises at least one transfer device to move said M second stage forming drums inside the second path of the crown structure building line.

Preferably, the plant comprises at least one transfer device to move said M second stage forming drums inside the second path of the crown structure building line from the first seat of the second path of the crown structure building line to the second seat of the second path of the crown structure building line.

Preferably, said at least one transfer device for moving said M second stage forming drums inside the second path of the crown structure building line comprises at least one anthropomorphic robot, more preferably with a robotized arm having at least 6 movement axes.

Preferably, the plant comprises at least one transfer device for transferring said N first stage forming drums from an unloading station of the first path of the carcass structure building line to the bead forming station and from the bead forming station to a first work station of the second path of the carcass structure building line. More preferably, for N>1, said at least one transfer device is adapted to transfer in sequence, one at a time, said N first stage forming drums from the unloading station of the first path of the carcass structure building line to the bead forming station and from the bead forming station to the first work station of the second path of the carcass structure building line.

Preferably, the plant comprises at least one transfer device for moving said N first stage forming drums inside the second path of the carcass structure building line.

Preferably, the plant comprises at least one transfer device for moving said N first stage forming drums inside the second path of the carcass structure building line from the first work station of the second path of the carcass structure building line to the third seat of the second path of the carcass structure building line.

Preferably, said at least one transfer device for moving said N first stage forming drums inside the second path of the carcass structure building line comprises at least one anthropomorphic robot, more preferably with a robotized arm having at least 6 movement axes.

Preferably, the first path of the crown structure building line comprises a plurality of work stations arranged in sequence between two ends of said first path.

Preferably, the first path of the crown structure building line comprises a mobile shuttle configured to move said M second stage forming drums between said plurality of work stations.

Preferably, said shuttle is configured to move said M second stage forming drums between said plurality of work stations in a sequence the same as or different from the spatial sequence of the plurality of work stations.

Preferably, said mobile shuttle is configured to move said M second stage forming drums along the first path of the crown structure building line. More preferably, for M>1 said mobile shuttle is configured to move said M second stage forming drums in sequence, one at a time along the first path of the crown structure building line.

Preferably, at one of the two ends of the first path of the crown structure building line a loading/unloading station of said first path is located.

Preferably, said loading/unloading station of the first path of the crown structure building line coincides with the first initial location that, in turn, coincides with the first final location.

Preferably, said shuttle is configured to move said M second stage forming drums in two opposite directions of travel from said loading/unloading station to then go back into said loading/unloading station.

Preferably, said shuttle is capable of moving, moved by a suitable motor, along suitable guides, preferably rectilinear.

Preferably, the first path of the carcass structure building line comprises a plurality of work stations arranged in sequence between two ends of said first path.

Preferably, at one of the two ends of the first path of the carcass structure building line a loading/unloading station of said first path is located.

Preferably, said loading/unloading station of the first path of the carcass structure building line coincides with the third initial location.

Preferably, the first path of the carcass structure building line comprises a mobile shuttle configured to move said N first stage forming drums between said plurality of work stations in a sequence which is the same as or different from the spatial sequence of the plurality of work stations.

Preferably, said mobile shuttle is configured to move said N first stage forming drums along the first path of the carcass structure building line. More preferably, for N>1 said mobile shuttle is configured to move said N first stage forming drums in sequence, one at a time along the first path of the carcass structure building line.

Preferably, said mobile shuttle is configured to move said N first stage forming drums in two opposite directions of travel starting from said loading/unloading station to then go back into said loading/unloading station.

Preferably, said shuttle is capable of moving, moved by a suitable motor, along suitable guides, preferably rectilinear.

Preferably, the loading/unloading station of the first path of the carcass structure building line is configured to arrange said N first stage forming drums so that their axial extension corresponds to geometric features of the tyre being processed.

Preferably, the first path and the second path of the crown structure building line extend substantially along two directions respectively parallel to two of three of said Cartesian axes (for example Y and X).

Preferably, the first path and the second path of the carcass structure building line extend substantially along two directions respectively parallel to two of three of said Cartesian axes (for example Y and X).

Preferably, the first path of the crown structure building line and the first path of the carcass structure building line face one another, one in front of the other.

Preferably, the second path of the crown structure building line and the second path of the carcass structure building line together form an elementary semi-finished products deposition area.

Preferably, said elementary semi-finished products deposition area extends beyond two ends of the first path of the crown structure building line and the first path of the carcass structure building line.

Preferably, said elementary semi-finished products deposition area extends substantially perpendicular to the first path of the crown structure building line and to the first path of the carcass structure building line so as to delimit an inner space.

Preferably, the shaping and assembly station is located in said inner space.

Preferably, the first path of the crown structure building line, the first path of the carcass structure building line and the substantially perpendicular elementary semi-finished products deposition area overall form a substantially C or U-shaped path.

Preferably, the first path of the crown structure building line is substantially rectilinear.

Preferably, the first path of the carcass structure building line is substantially rectilinear.

Preferably, the first path of the crown structure building line and the first path of the carcass structure building line are substantially parallel.

Preferably, the bead forming station is arranged close to an end of the first path of the carcass structure building line.

Preferably, the bead forming station is arranged at a corner area between the first path of the carcass structure building line and the second path of the carcass structure building line.

Preferably, the bead forming station is arranged at a corner area between the first path of the carcass structure building line and the elementary semi-finished products deposition area.

Preferably, the first path of the carcass structure building line is associated with a storage area adapted to store said semi-finished products.

Preferably, the first path of the carcass structure building line is associated with feeders adapted to receive the semi-finished products stored in the relative storage area and deposit them on said N first stage forming drums.

Preferably, with respect to the inner space where the shaping and assembly station is located, the storage area and the relative feeders are located outside of the first path of the carcass structure building line.

Preferably, the first path of the crown structure building line comprises a storage area adapted to store said semi-finished products.

Preferably, the first path of the crown structure building line is associated with feeders adapted to receive the semi-finished products stored in the relative storage area and deposit them on said M second stage forming drums.

Preferably, with respect to the inner space where the shaping and assembly station is located, the storage area and the relative feeders are located outside of the first path of the crown structure building line.

Preferably, the second path of the carcass structure building line comprises at least one dispensing device (like for example, an extruder) adapted to dispense said elementary semi-finished products. Preferably, with respect to the inner space where the shaping and assembly station is located, said dispensing device is located outside of the second path of the carcass structure building line.

Preferably, the second path of the crown structure building line comprises at least one dispensing device (like, for example, an extruder) adapted to dispense said elementary semi-finished products. Preferably, with respect to the inner space where the shaping and assembly station is located, said dispensing device is located outside of the second path of the crown structure building line.

Preferably, each dispensing device is associated with a suitable container of the material constituting the elementary semi-finished product.

Preferably, the bead forming station is associated with a bead core storage station.

Preferably, said N first stage forming drums are substantially cylindrical.

Preferably, said M second stage forming drums have a variable geometry from cylindrical to slightly convex (toroidal).

Preferably, the plant also comprises a molding and vulcanization line.

Preferably, the plant also comprises transfer devices adapted to transfer the shaped green tyre, exiting from the shaping and assembly station, to the molding and vulcanization line.

Preferably, at the shaping and assembly station, a suitable waiting station is provided adapted to receive the shaped green tyre exiting from the shaping and assembly station, waiting to be transferred to the molding and vulcanization line.

Preferably, the plant has a building cycle time of green tyres cadenced by the shaping and assembly station. Preferably said building cycle time is less than 100 s, more preferably it is less than or equal to 90 s.

Figure 2:
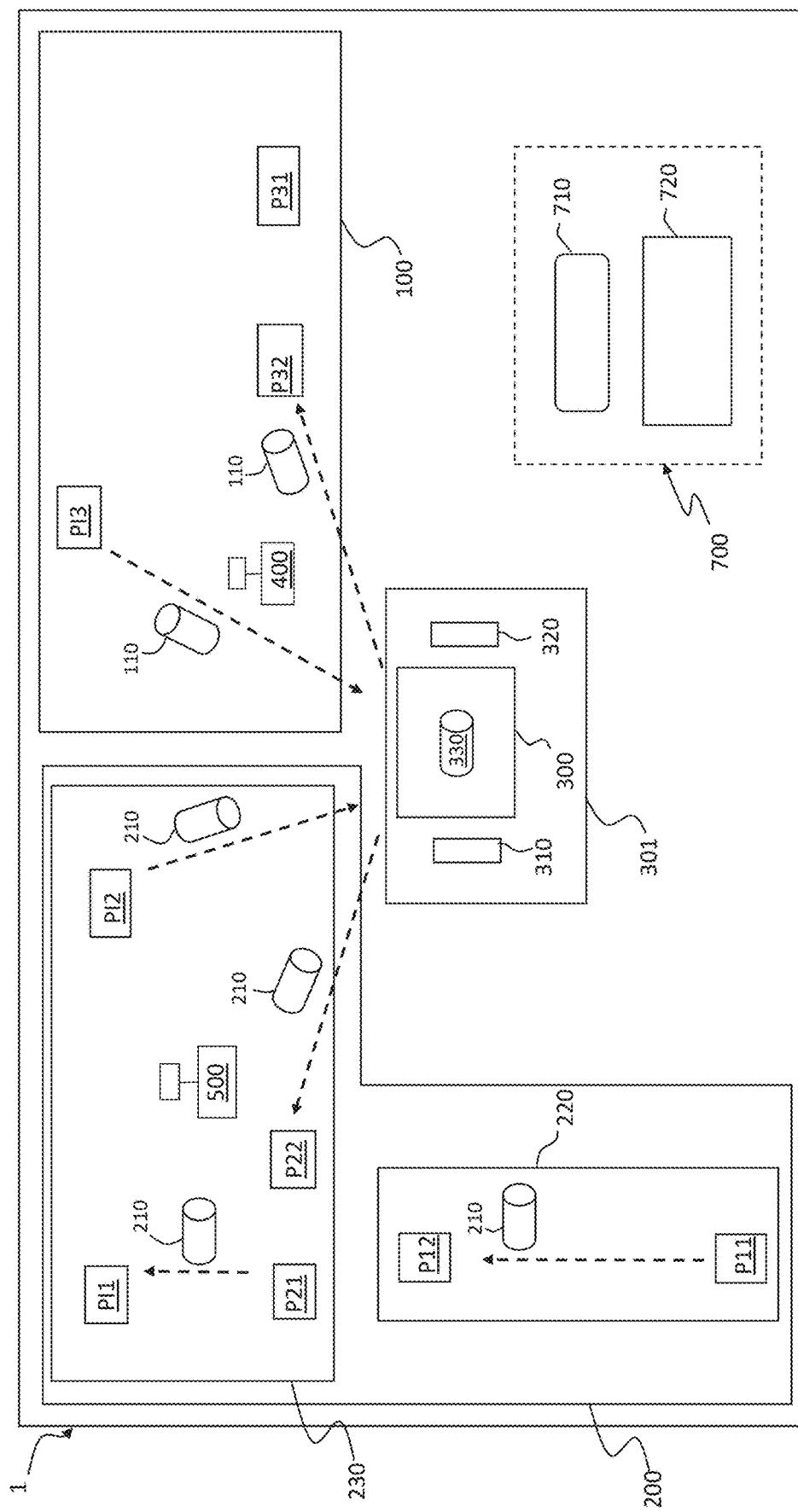
Figure 3:
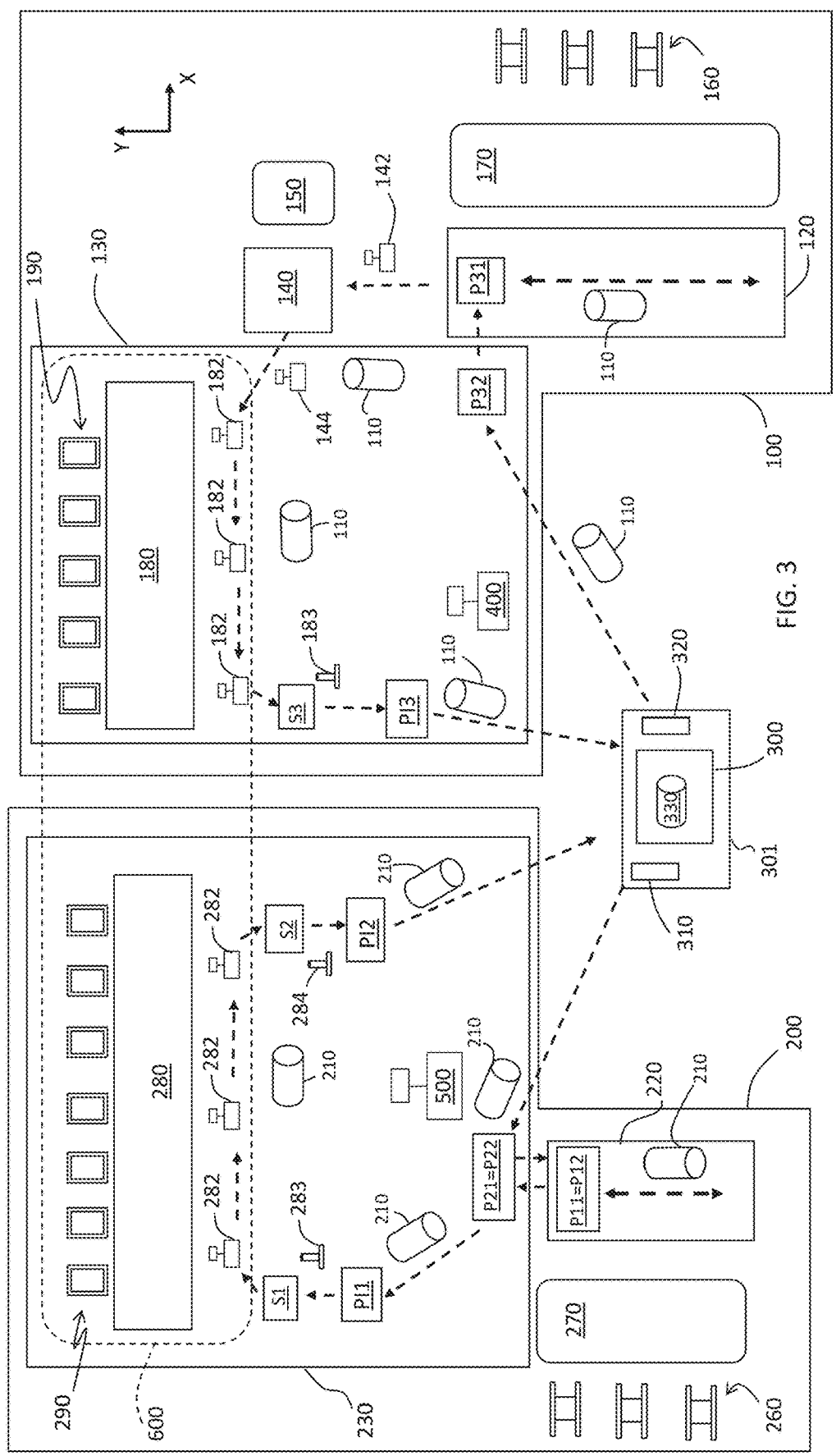
Figure 4:
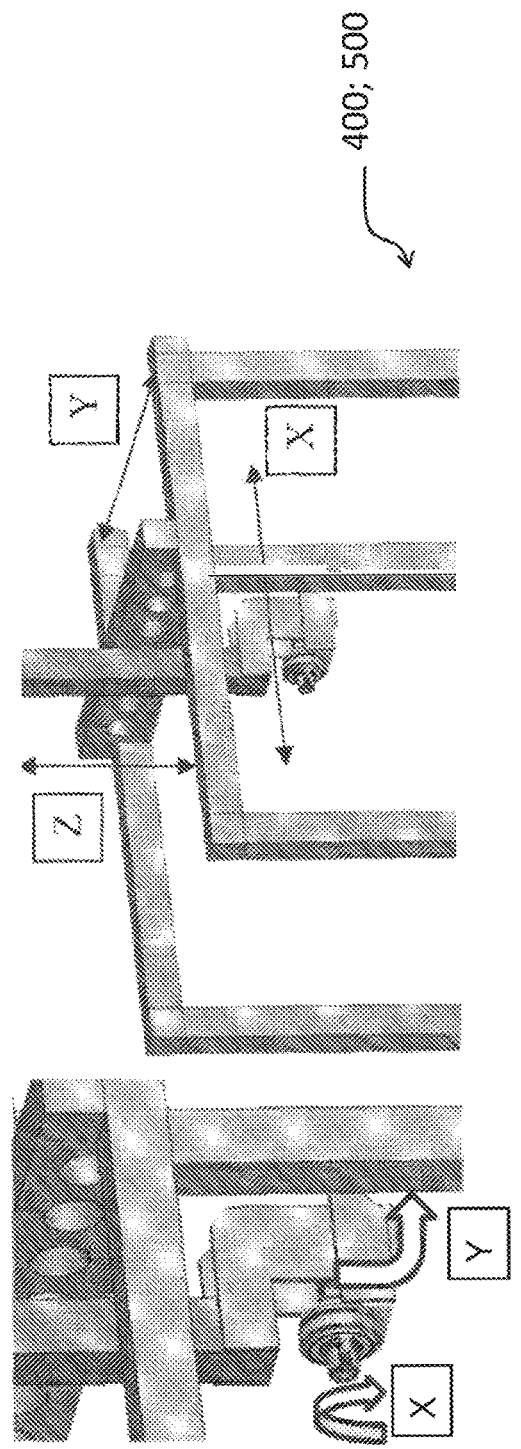
Figure 5:
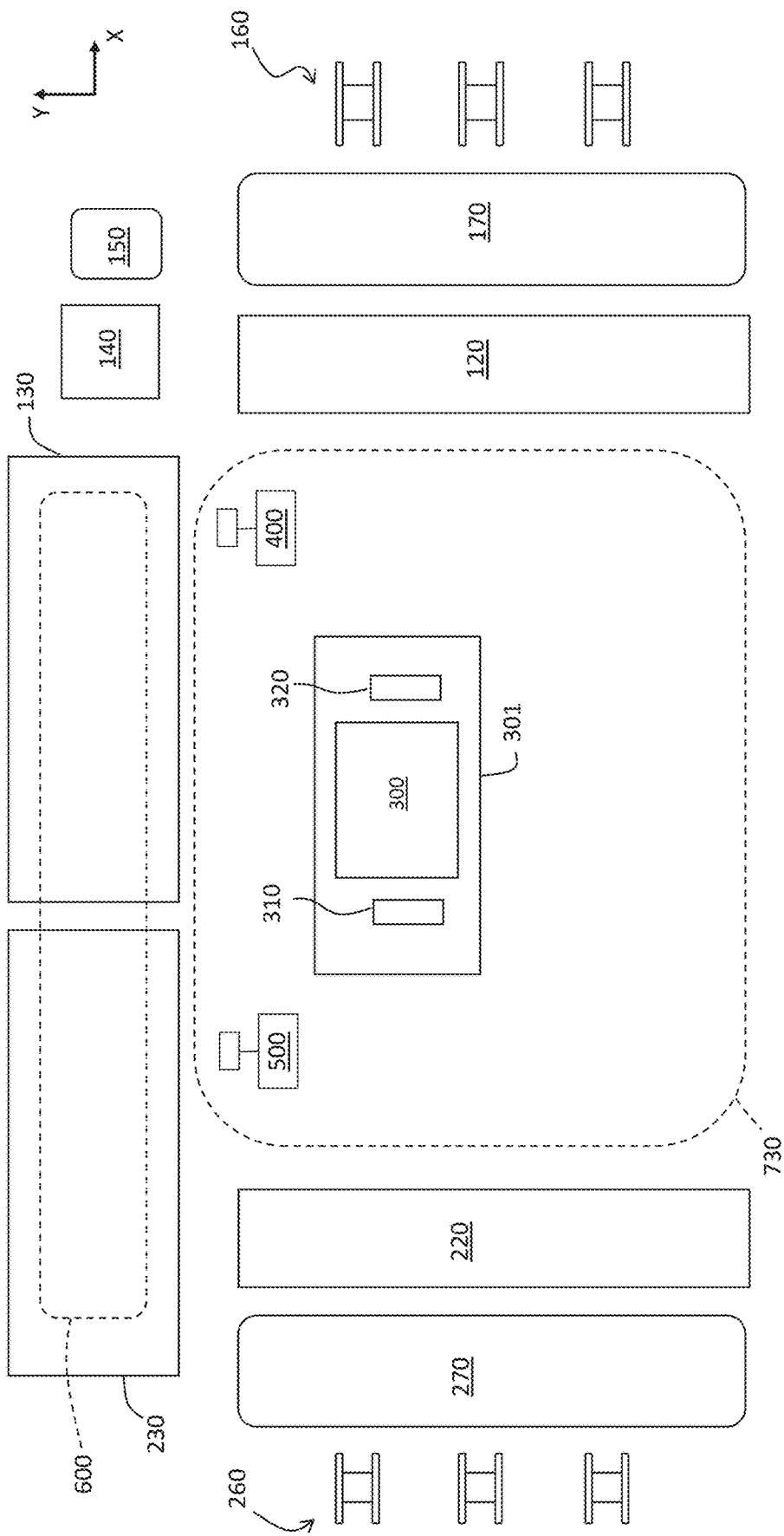

Further features and advantages of the present invention will be made clear by the following detailed description of some exemplary embodiments thereof, provided only as non-limiting examples, said description being carried out with reference to the attached drawings, in which:

FIG. 1 shows a radial half-section of a tyre that can be made through the method and the plant according to the invention;

FIG. 2 schematically shows a plant for producing tyres for vehicle wheels according to an embodiment of the invention;

FIG. 3 schematically shows a plant for producing tyres for vehicle wheels according to a further embodiment of the invention;

FIG. 4 schematically shows the axes X, Y, Z, and the rotations about two of said axes X, Y, for a manipulator according to an embodiment of the invention;

FIG. 5 schematically shows the layout of the plant of FIG. 3.

FIG. 1 shows an example of a tyre 2 that can be produced in a plant 1 for producing tyres for vehicle wheels.

The tyre 2 has a mid-plane A perpendicular to the rotation axis R thereof (it should be specified that in FIG. 2 the position of the rotation axis R with respect to the section of the tyre 2 is shown in a totally indicative and schematic manner). The mid-plane A divides the tyre 2 into a first axial half 2a and into a second axial half. For the sake of simplicity of illustration, FIG. 2 shows only the first axial half 2a of the tyre 2, the other half being substantially the mirror image (except for the tread pattern that may not be symmetrical with respect to the aforementioned mid-plane A).

The tyre 2 essentially comprises a carcass structure 3 having one or two carcass plies 4a, 4b. A layer of impermeable elastomeric material or so-called liner 5 is applied inside the carcass ply(-ies) 4a, 4b. Two annular anchoring structures 6 (only that of the axial half 2a of which is shown in FIG. 2) are engaged, in axially opposite positions (with respect to the mid-plane A), to respective axial ends of the carcass ply(-ies) 4a, 4b. The two annular anchoring structures 6 each comprise a so-called bead core 6a carrying an elastomeric filler 6b in radially outer position. The two annular anchoring structures 6 are integrated close to areas usually identified with the name "beads" 7 (only that of the axial half 2a of which is shown in FIG. 2), at which the engagement between the tyre 2 and a respective mounting rim usually takes place. A belt structure 8 comprising belt layers 8a, 8b is circumferentially applied around the carcass ply(-ies) 4a, 4b, and a tread band 9 is circumferentially juxtaposed over the belt structure 8. The belt structure 8 can comprise a further so-called zero degrees layer (not illustrated) in radially outer position to the aforementioned layers 8a, 8b. The belt structure 8 can also be associated with so-called "under-belt inserts" 10 each arranged between the carcass ply(-ies) 4a, 4b and one of the axially opposite end edges of the belt structure 8. Two sidewalls 11, each extending from the respective bead 7 to a corresponding lateral edge of the tread band 9, are applied in axially opposite positions (with respect to the mid-plane A) on the carcass ply(-ies) 4a, 4b. The assembly of the portion of each sidewall 11 close to the respective lateral edge of the tread band 9 and of each portion of the tread band 9 close to the respective sidewall 11 is known as shoulder 12 of the tyre.

FIG. 2 shows a plant 1 for producing tyres 2 for vehicle wheels according to an embodiment of the invention.

With particular reference to FIG. 2, the plant 1 comprises a carcass structure building line 100, a crown structure building line 200 and a shaping and assembly machine 300.

In a steady state operation of the plant, the carcass structure building line 100 is adapted to build (simultaneously for N>1) N carcass structures on N first stage forming drums 110. In turn, the crown structure building line 200 is adapted to build (simultaneously for M>1) M crown structures on M second stage forming drums 210. For this purpose, the carcass structure building line 100 and the crown structure building line 200 are each equipped with one or more work stations (not illustrated).

N and M are integers greater than or equal to 1, preferably greater than or equal to 5 and even more preferably equal to 6. In a preferred embodiment, considered in the following description, N=M>1.

Preferably, the first stage forming drums 110 are substantially cylindrical.

Preferably, the second stage forming drums 210 have a variable geometry from cylindrical to slightly convex.

The crown structure building line 200 is adapted to build the M crown structures on the M second stage forming drums 210 along:
- a first path 220, which starts in a first initial location P11 and ends in a first final location P12, for building a first part of components of the crown structure, comprising at least one belt layer, and
- a second path 230, which starts in a second initial location P21 and ends in a second final location P22, passing through a first intermediate location PI1 and a second intermediate location PI2, for building a second part of components of the crown structure, comprising at least the tread band.

The carcass structure building line 100 is adapted to build the N carcass structures on the N first stage forming drums 110 from a third initial location P31 to a third final location P32, passing through a third intermediate location PI3.

The shaping and assembly machine 300 is part of a shaping and assembly station 301 comprising a first loading/unloading device 310 and a second loading/unloading device 320 associated with the shaping and assembly machine 300.

The shaping and assembly machine 300 is adapted to shape in sequence, one at a time, the N carcass structures, that progressively arrive from the carcass structure building line 100, and assembling them to the M respective crown structures, that progressively arrive from the crown structure building line 200, so as to obtain a green tyre. The shaping and assembly machine 300 is adapted to shape the carcass structures and assembling them to the respective crown structures on a shaping drum 330. It therefore operates on carcass structures and crown structures dissociated from the respective first stage drums 110 and second stage drums 210.

The M second stage forming drums 210 are moved in the crown structure building line 200 independently and simultaneously with respect to the N first stage forming drums 110 in the carcass structure building line 100, to then convey towards the shaping and assembly station 301. In the case of N different from M and/or different building cycle times between the carcass structure building line 100 and the crown structure building line 200, it is possible to provide suitable waiting locations for the drums waiting to release the respective crown and carcass structures to the shaping and assembly station 301.

The built green tyres, exiting from the shaping and assembly machine 300, are then transferred to a molding and vulcanization line 700 of the plant 1 where a molding and vulcanization process is carried out adapted to define the structure of the tyre according to a desired geometry and tread pattern, for obtaining finished tyres.

The molding and vulcanization line 700 comprises a storage area 710 adapted to store the built green tyres arriving from the shaping and assembly machine 300 and a molding and vulcanization area 720 comprising a plurality of vulcanizers (not shown). The molding and vulcanization line 700 also comprises movement devices (not shown) adapted to transfer the green tyres from the storage area 710 to said plurality of vulcanizers. Moreover, it is associated with movement devices (not shown) adapted to transfer the built green tyres from the shaping and assembly machine 300 to the storage area 710.

The plant 1 also comprises a first manipulator 500 and a second manipulator 400.

The first manipulator 500 is, preferably, a non-anthropomorphic Cartesian robot with at least five degrees of freedom to allow the movement of said M second stage forming drums 210 along three Cartesian axes X, Y, Z and a rotation about two of said Cartesian axes X and Y. This, advantageously, allows the rotation of the second stage forming drums 210 about the rotation axis thereof (axis X coinciding with axis R) and the passage of the drums from a position in which the rotation axis thereof is oriented vertically (parallel to the axis Z) to a position in which the rotation axis thereof is oriented horizontally (for example, parallel to the axis X).

The second manipulator 400 is, preferably, a non-anthropomorphic Cartesian robot with at least five degrees of freedom to allow the movement of said N first stage forming drums 110 along three Cartesian axes X, Y, Z and a rotation about two of said Cartesian axes X and Y. This, advantageously, allows the rotation of the first stage forming drums 110 about the rotation axis thereof (axis X coinciding with axis R) and the passage of the drums from a position in which the rotation axis thereof is oriented vertically (parallel to the axis Z) to a position in which the rotation axis thereof is oriented horizontally (for example, parallel to the axis X).

The axes X, Y, Z, and the rotations about the aforementioned axes X and Y are schematically illustrated in FIG. 4.

With respect to an anthropomorphic robot (having in general a substantially spherical work volume), a Cartesian robot (having in general a substantially parallelepiped work volume) advantageously enables to operate in the plane X,Y on wide working areas with a more limited bulk. This is advantageous in terms of reduction of the spaces occupied and also in terms of precision and safety (considering that to obtain a same working area an anthropomorphic robot should be equipped with a very long arm).

The first manipulator 500 is capable of operating on the second stage drums 210 in a working area (not illustrated) inside which the first loading/unloading device 310 and the second initial location P21, the second final location P22, the first intermediate location PI1 and the second intermediate location PI2 of the second path 230 of the crown structure building line 200 are located.

The second manipulator 400 is capable of operating on the first stage drums 110 in a working area (not illustrated) inside which the second loading/unloading device 320, the third final location P32 and the third intermediate location PI3 of the carcass structure building line 100 are located.

As schematically illustrated in FIG. 2 by dashed arrows, the first manipulator 500 is configured both to transfer in sequence, one at a time, the M second stage forming drums 210, carrying M respective crown structures being processed, from the second initial location P21 to the first intermediate location PI1 of the second path 230 of the crown structure building line 200 and to manage the M second stage forming drums 210 arriving into the second intermediate location PI2, carrying the M respective crown structures, by delivering, in sequence one at a time the M crown structures (dissociated from the respective second stage forming drum 210) to the first loading/unloading device 310 and the respective second stage forming drums 210 to the second final location P22.

The first manipulator 500 is preferably configured to pick up the M second stage forming drums 210 from the second initial location P21 and deliver them to the first intermediate location PI1 with rotation axis thereof oriented vertically.

The first manipulator 500 is preferably configured to pick up the M second stage forming drums 210 from the second intermediate location PI2 with rotation axis thereof oriented vertically.

In general, the vertical orientation during the displacement operations of the drums makes it possible to simplify the delivery operations since it exploits the force of gravity and avoids possible problems of elastic returns.

During the delivery of the M crown structures to the first loading/unloading device 310, the first manipulator 500 is preferably configured to support the respective second stage forming drums 210 with rotation axis thereof oriented horizontally. The horizontal orientation is required here since the shaping drum 330 used by the shaping and assembly machine 300 operates with rotation axis oriented horizontally. It should be observed that, with respect to an anthropomorphic robot, a Cartesian robot, such as the first manipulator 500, is capable of carrying out this delivery operation, in which the second stage forming drums 210 are supported with rotation axis oriented horizontally, with greater reliability since in a Cartesian robot, the possible correction on the positioning of an axis takes place by acting on the single axis to be corrected. With an anthropomorphic robot, to correct the position of an axis it is necessary on the other hand to act on many axes that are kinematically linked.

During the delivery of the M second stage forming drums 210 to the second final location P22, the first manipulator is preferably configured to support the M second stage forming drums 210 with rotation axis thereof oriented vertically.

As schematically illustrated in FIG. 2 by dashed arrows, the second manipulator 400 is configured to manage the N first stage forming drums 110 arriving into the third intermediate location PI3, carrying the N respective carcass structures, by delivering in sequence one at a time the N carcass structures (dissociated from the respective first stage forming drum 110) to the second loading/unloading device 320 and the respective first stage forming drums 110 to the third final location P32.

The second manipulator 400 is preferably configured to pick up the N first stage forming drums 110 from the third intermediate location PI3 with rotation axis thereof oriented vertically.

During the delivery of the N carcass structures to the second loading/unloading device 320, the second manipulator 400 is preferably configured to support the respective first stage forming drums 110 with rotation axis thereof oriented horizontally. As observed above, it is highlighted that, with respect to an anthropomorphic robot, a Cartesian robot, such as the second manipulator 400, is capable of carrying out this operation, in which the first stage forming drums 110 are supported with rotation axis oriented horizontally, with greater reliability.

During the delivery of the N first stage forming drums 110 to the third final location P32, the second manipulator 400 is preferably configured to support the N first stage forming drums 110 with rotation axis thereof oriented vertically.

The second loading/unloading device 320 and the first loading/unloading device 310 are adapted to deliver, respectively, the built carcass structure and the built crown structure delivered to them to the shaping and assembly machine 300 to carry out the toroidal shaping of the built carcass structure and the assembly to the built crown structure on the shaping drum 330.

In particular, the second loading/unloading device 320 is configured to receive from the second manipulator 400, in sequence, one at a time, the N carcass structures, dissociated from the respective N first stage drums 110, and associate them with the shaping drum 330.

The first loading/unloading device 310 is configured to receive from the first manipulator 500, in sequence, one at a time, the M crown structures, dissociated from the respective M second stage forming drums 210, and associate them with the shaping drum 330 on the respective carcass structure.

In a preferred embodiment, the first path 220 of the crown structure building line 200 is adapted to build the first part of components of the crown structure through deposition of semi-finished products in one or more suitable work stations (not illustrated). In turn, the second path 230 of the crown structure building line 200 is adapted to build the second part of components of the crown structure through deposition of elementary semi-finished products in one or more suitable work stations (not illustrated).

FIG. 3 shows a plant 1 according to a second embodiment that has the same functional and structural features of the embodiment illustrated in FIG. 2 (the molding and vulcanization line 700 of FIG. 2 being omitted for the sake of simplicity of illustration), for which reference should be made to the above description, in addition to further features described hereinafter.

In the embodiment of FIG. 3, the first path 220 of the crown structure building line 200 comprises a plurality of work stations (not illustrated). Along the first path 220 of the crown structure building line 200 one of the M second stage forming drums 210 is moved at a time.

Such work stations are preferably arranged in sequence between two ends of the first path 220 of the crown structure building line 200, the first initial location P11 being positioned at one of said two ends and coinciding with the first final location P12.

In particular, along the first path 220 of the crown structure building line 200, each second stage forming drum 210 is moved, forwards and backwards, between one or more of said plurality of work stations from the first initial location P11 to then go back into said first initial location P11, which coincides with the first final location P12.

Each second stage forming drum 210 can be moved between said plurality of work stations in a sequence which is the same as or different from the spatial sequence of such a plurality of work stations.

Along the first path 220 of the crown structure building line 200, each second stage forming drum 210 is preferably moved through a mobile shuttle (not shown). The shuttle is preferably capable of moving, moved by a suitable motor, along suitable guides (preferably rectilinear) in two opposite directions of travel from/towards said first initial location P11, coinciding with the first final location P12.

Said plurality of work stations of the first path 220 of the crown structure building line 200 are arranged to form, on each second stage forming drum 210, said first part of components of the crown structure being processed, comprising at least one belt layer, according to a predetermined recipe. In particular each second stage forming drum 210 is preferably moved between the work stations of the first path 220 according to a sequence defined by a reference specification that is programmable/configurable for every tyre being processed. This advantageously makes it possible to obtain high technological flexibility.

According to a preferred embodiment, the work stations of the first path 220 of the crown structure building line 200 are arranged to form the first part of components of the crown structure being processed through deposition of semi-finished products. Such semi-finished products are preferably made of elastomeric material reinforced with cords of textile and/or metallic and/or hybrid material. Such cords are preferably arranged parallel to one another and oriented with a certain angle with respect to the longitudinal extension of the semi-finished product.

Preferably, the first path 220 of the crown structure building line 200 is associated with a storage area 260 adapted to store said semi-finished products. Preferably, the first path 220 of the crown structure building line 200 is associated with feeders 270 adapted to receive the semi-finished products stored by the relative storage area 260 and deposit them on the second stage forming drum 210.

The first path 220 of the crown structure building line 200 comprises, for example, at least some of the following work stations:
- an optional under-belt insert application station (present unless such a station is not already comprised in the first path 120 of the carcass structure building line 100);
- at least one application station of a belt layer;
- an application station of an under-layer.

In an preferred embodiment illustrated in FIG. 3, the second path 230 of the crown structure building line 200 comprises a plurality of work stations (not illustrated) along which the M second stage forming drums 210 are moved as they progressively exit from the first path 220 of the crown structure building line 200.

In the embodiment illustrated in FIG. 3, the second initial location P21 and the second final location P22 of the second path 230 of the crown structure building line 200 coincide.

Moreover, in a preferred embodiment (not illustrated), the first initial location P11, the first final location P12, the second initial location P21 and the second final location P22 coincide. In this case, it is the first manipulator 500 that takes care of transferring the M second stage drums 210 from the first final location P12 to the second initial location P21 (as they coincide) and from the second final location P22 to the first initial location P11 (as they coincide) in order to start a new building cycle. Differently, between the locations P12 and P21 and between the locations P22 and P11 suitable transfer devices (not illustrated) will be provided, adapted to transfer the M second stage forming drums 210. The transfer from the first initial location P11 (coinciding with the first final location P12) to the second initial location P21 (coinciding with the second final location P22) and the transfer from the second final location P22 (coinciding with the first initial location P21) to the first initial location P11 (coinciding with the first final location P12) are schematically illustrated in FIG. 3 by two dashed arrows between the relative locations.

Each second stage forming drum 210 can be moved between said plurality of work stations of the second path 230 in a sequence which is the same as or different from the spatial sequence of such a plurality of work stations.

Said plurality of work stations of the second path 230 are arranged to form, on each second stage forming drum 210, said second part of components of the crown structure being processed, comprising at least the tread band, according to a predetermined recipe. In particular, each second stage forming drum 210 is preferably moved between the work stations of the second path 230 according to a sequence defined by a reference specification that is programmable/configurable for every tyre being processed. This advantageously makes it possible to obtain high technological flexibility.

According to a preferred embodiment, the work stations of the second path 230 are arranged to form the second part of components of the crown structure being processed through deposition of elementary semi-finished products.

For this purpose, each of the work stations of the second path 230 is equipped with suitable dispensing and deposition devices of elementary semi-finished products, wholly indicated with reference numeral 280 (for example, extruders). Preferably, at least some work stations of the second path 230 are each equipped with two or more dispensing devices 280 adapted to dispense different elementary semi-finished products (preferably by type of elastomeric material) so as to make it possible to select the type of elementary semi-finished product to be dispensed, depending on the predetermined recipe for the tyre being processed. This advantageously makes it possible to obtain high technological flexibility.

Such elementary semi-finished products are preferably made of only elastomeric material.

Preferably, the second path 230 of the crown structure building line 200 is associated with a storage area 290 with suitable containers for the materials constituting said elementary semi-finished products. The dispensing devices 280 are adapted to receive the elementary semi-finished products from the relative storage area 290 and depositing them on the second stage forming drum 210.

The second path 230 of the crown structure building line 200 preferably comprises a plurality of transfer devices 282 adapted to move the second stage forming drums 210 between the stations of the second path 230 and for supporting them during the deposition step of the elementary semi-finished products on them.

Preferably, the transfer devices 282 are anthropomorphic robots, preferably with a robotized arm having at least 6 movement axes.

In an embodiment shown in FIG. 3, the second path 230 of the crown structure building line 200 comprises a first translating support 283 adapted to transfer in sequence, one at a time, said M second stage forming drums 210 from said first intermediate location PI1 to a first seat S1 of the second path 230 of the crown structure building line 200, which is outside of the working area of the first manipulator 500.

Preferably, the second path 230 of the crown structure building line 200 also comprises a second translating support 284 adapted to transfer in sequence, one at a time, said M second stage forming drums 210 from a second seat S2 of the second path 230 of the crown structure building line 200, which is located outside of the working area of the first manipulator 500, to said second intermediate location PI2.

Each of said first and said second translating support 283, 284 is preferably adapted to receive in sequence, one at a time, said M second stage drums 210 with rotation axis thereof oriented vertically.

The transfer devices 282 are adapted to move said M second stage forming drums between the work stations of the second path 230 of the crown structure building line 200 starting from the first seat S1 to the second seat S2.

Thanks to the presence of the first translating support 283, once the first manipulator 500 transfers the M second stage drums 210 from the second initial location P21 to the first intermediate location PI1 of the second path 230 of the crown structure building line 200, they are then transferred by means of the first translating support 283 to the first seat S1, from which they are then picked up by the transfer devices 282.

Moreover, once the building process along the work stations of the second path 230 of the crown structure building line 200 has ended, the transfer devices 282 carry the M second stage drums 210 to the second seat S2, from which they are then transferred to the second intermediate location PI2 by means of the second translating support 284.

Since the two seats S1, S2 are outside of the working area of the manipulator 500, possible dangerous interference between the transfer devices 282 and the manipulator 500 is avoided. This solution also allows better management of the safety areas inside the crown structure building line 200.

The second path 230 of the crown structure building line 200 comprises at least one of the following work stations:

at least one tread band application station through coiling of a continuous elongated element around the second stage forming drum 210;

an application station of a portion of sidewalls through coiling of a continuous elongated element around the second stage forming drum 210.

In the embodiment of FIG. 3, the carcass structure building line 100 comprises a first path 120, which starts in said third initial location P31, for building a first part of components of the carcass structure, comprising at least one carcass ply, and a second path 130, which ends in said third final location P32, passing through said third intermediate location PI3, for building a second part of components of the carcass structure, comprising at least one among anti-abrasive insert and portion of sidewalls.

In a preferred embodiment (not illustrated), the third initial location P31 coincides with the third final location P32. In this case, it is the second manipulator 400 that deals with transferring the N first stage drums 110 from the third final location P32 to the third initial location P31 (since they coincide) in order to start a new carcass structure building cycle. Differently, between the third final location P32 and the third initial location P31 suitable transfer devices (not illustrated) will be provided, adapted to transfer the N first stage forming drums 110. The transfer from the third final location P32 to the third initial location P31 is schematically illustrated in FIG. 3 by a dashed arrow between the two locations.

In the illustrated embodiment, the carcass structure building line 100 comprises a bead forming station 140 between the first path 120 and the second path 130 of the carcass structure building line 100. The bead forming station 140 is adapted to carry out in sequence, on one of the N first stage forming drums 110 at a time, the engagement of axially opposite ends of the carcass structure being processed to respective annular anchoring structures. The bead forming station 140 is associated with a storage station 150 of annular anchoring structures, called bead cores.

The carcass structure building line 100 also comprises a transfer device 142 adapted to transfer in sequence, one at a time, the N first stage forming drums 110 exiting from the first path 120 of the carcass structure building line 100 to the bead forming station 140 and a transfer device 144 adapted to transfer in sequence, one at a time, the N first stage forming drums 110 exiting from the bead forming station 140 to the second path 130 of the carcass structure building line 100. Each of such transfer devices 142, 144 can comprise an anthropomorphic robot (preferably with a robotized arm having at least 6 movement axes) or a non-anthropomorphic Cartesian movement device, which allows the movement according to three Cartesian axes X, Y, Z and, preferably, the rotation about two of said Cartesian axes X and Y.

Preferably, the transfer of the N first stage forming drums 110 from the first path 120 of the carcass structure building line 100 to the bead forming station 140 takes place from an unloading station of the first path 120 of the carcass structure building line 100.

In the illustrated embodiment, such an unloading station consists of the third initial location P31. In particular, in the embodiment of FIG. 3, the third initial location P31 of the carcass structure building line 100 acts as entry/exit location (or, similarly, drum loading/unloading location) for the first path 120 of the carcass structure building line 100 where both empty first stage drums 110, entering into the first path 120 (ready to start a new building cycle) and first stage drums 110, carrying respective carcass structures being processed, exiting from the first path 120 (ready to continue the building cycle of the carcass structure in the bead forming station 140), transit.

Preferably, the third initial location P31, such as the entry location for the first path 120 of the carcass structure building line 100, is configured to arrange said N first stage forming drums 110 so that their axial extension corresponds to geometric features of the tyre being processed.

In a preferred embodiment illustrated in FIG. 3, the first path 120 of the carcass structure building line 100 comprises a plurality of work stations (not illustrated). Along the first path 120 of the carcass structure building line 100 one of the N first stage forming drums 110 is moved at a time.

Such work stations are preferably arranged in sequence between two ends of the first path 120 of the carcass structure building line 100, the third initial location P31 being positioned at one of said two ends. Preferably, each first stage forming drum 110 can be moved between said plurality of work stations in a sequence which is the same as or different from the spatial sequence of such a plurality of work stations.

Preferably, along the first path 120 of the carcass structure building line 100, each first stage forming drum 110 is moved between one or more of said plurality of work stations starting from the third initial location P31 and then brought back into said third initial location P31. Along the first path 120 of the carcass structure building line 100, each first stage forming drum 110 is preferably moved through a mobile shuttle (not shown). The shuttle is preferably capable of moving, moved by a suitable motor, along suitable guides (preferably rectilinear) in two opposite directions of travel from/towards said third initial location P31.

Said plurality of work stations of the first path 120 of the carcass structure building line 100 are arranged to form, on each first stage forming drum 110, said first part of components of the carcass structure being processed, according to a predetermined recipe. In particular each first stage forming drum 110 is preferably moved between the work stations of the first path 120 of the carcass structure building line 100 according to a sequence defined by a reference specification that is programmable/configurable for every tyre being processed. This advantageously makes it possible to obtain high technological flexibility.

According to a preferred embodiment, the work stations of the first path 120 of the carcass structure building line 100 are arranged to form the first part of components of the carcass structure being processed through deposition of semi-finished products. Such semi-finished products are preferably made of elastomeric material reinforced with cords of textile and/or metallic and/or hybrid material. Such cords are preferably arranged parallel to one another and oriented with a certain angle with respect to the longitudinal extension of the semi-finished product.

Preferably, the first path 120 of the carcass structure building line 100 is associated with a storage area 160 adapted to store said semi-finished products. Preferably, the first path 120 of the carcass structure building line 100 is associated with feeders 170 adapted to receive the semi-finished products stored by the relative storage area 160 and depositing them on the first stage forming drum 110.

The first path 120 of the carcass structure building line 100 comprises, for example, at least some of the following work stations:
  a liner application station;
  an under-liner application station;
  at least one application station of a carcass ply;
  an optional metallic and/or textile reinforcement application station;
  an optional under-belt insert application station.

The first path 120 of the carcass structure building line 100 does not provide for a bead formation operation that on the other hand is made in the bead forming station 140.

Along the first path 120 of the carcass structure building line 100, the building of the first part of components of the carcass structure is preferably carried out with the first stage forming drum 110 associated with a pair of axially opposite support rings (not shown).

In the bead forming station 140 and along the second path 130 of the carcass structure building line 100, the first stage forming drum 110 is dissociated from the pair of support rings.

In a preferred embodiment illustrated in FIG. 3, the second path 130 of the carcass structure building line 100 comprises a plurality of work stations (not illustrated) along which the N first stage forming drums 110 are moved as they progressively exit from the bead forming station 140.

Each first stage forming drum 110 can be moved between said plurality of work stations of the second path 130 in a sequence which is the same as or different from the spatial sequence of such a plurality of work stations.

Said plurality of work stations of the second path 130 of the carcass structure building line 100 are arranged to form, on each first stage forming drum 110, said second part of components of the carcass structure being processed, according to a predetermined recipe. In particular each first stage forming drum 110 is preferably moved between the work stations of the second path 130 according to a sequence defined by a reference specification that is programmable/configurable for every tyre being processed. This advantageously makes it possible to obtain high technological flexibility.

According to a preferred embodiment, the work stations of the second path 130 of the carcass structure building line 100 are arranged to form the second part of components of the carcass structure being processed through deposition of elementary semi-finished products.

For this purpose, each of the work stations of the second path 130 is equipped with suitable dispensing and deposition devices of elementary semi-finished products, wholly indicated in FIG. 3 with reference numeral 180 (for example, extruders). Preferably, at least some work stations of the second path 130 of the carcass structure building line 100 are each equipped with two or more dispensing devices 180 adapted to dispense different elementary semi-finished products (preferably by type of elastomeric material) so as to make it possible to select the type of elementary semi-finished product to be dispensed, depending on the predetermined recipe for the tyre being processed. This advantageously makes it possible to obtain high technological flexibility.

Such elementary semi-finished products are preferably made of only elastomeric material.

Preferably, the second path 130 of the carcass structure building line 100 is associated with a storage area 190 with suitable containers for the materials constituting said elementary semi-finished products. The dispensing devices 180 are adapted to receive the elementary semi-finished products from the relative storage area 190 and depositing them on the first stage forming drum 110.

The second path 130 of the carcass structure building line 100 preferably comprises a plurality of transfer devices 182 adapted to move the first stage forming drums 110 between the work stations of the second path 130 of the carcass structure building line 100 and supporting them during the deposition step of the elementary semi-finished products on them.

Preferably, the transfer devices 182 are anthropomorphic robots, preferably with a robotized arm having at least 6 movement axes.

Preferably, the second path 130 of the carcass structure building line 100 comprises a third translating support 183 adapted to transfer in sequence, one at a time, said N first stage forming drums 110 from a third seat S3 of the second path 130 of the carcass structure building line 100, which is located outside of the working area of the second manipulator 400, to said third intermediate location PI3.

Said third translating support 183 is adapted to receive in sequence, one at a time, said N first stage drums 110 with rotation axis thereof oriented vertically.

The transfer devices 182 are adapted to move said N first stage forming drums 110 between the work stations of the second path 130 of the carcass structure building line 100 starting from a first work station of the second path 130 of the carcass structure building line 100 to the third seat S3 of the second path 130 of the carcass structure building line 100.

Thanks to the presence of the third translating support 183, once the building process along the work stations of the second path 130 of the carcass structure building line 100 has ended, the transfer devices 182 are capable of leaving the N first stage forming drums 110 at the third seat S3, from which they are then transferred to the third intermediate location PI3 by means of the third translating support 183.

Since the third seat S3 is outside of the working area of the second manipulator 400, possible dangerous interference between the transfer devices 182 and the manipulator 400 is avoided. This solution also allows better management of the safety areas inside the carcass structure building line 100.

The second path 130 of the carcass structure building line 100 comprises, for example, at least one of the following work stations:
  an application station of anti-abrasive inserts through coiling of a continuous elongated element about the first stage forming drum 110;
  an application station of a portion of sidewalls through coiling of a continuous elongated element about the first stage forming drum 110.

Preferably, the first path 120 of the carcass structure building line 100 is substantially rectilinear.

Preferably, the first path 220 of the crown structure building line 200 is substantially rectilinear.

Preferably, the first path 120 of the carcass structure building line 100 and the first path 220 of the crown structure building line 200 are substantially parallel.

In the embodiment illustrated in FIG. 3, the first path 220 and the second path 230 of the crown structure building line 200 extend substantially along two directions respectively parallel to said axes Y and X.

Preferably, the first path 120 and the second path 130 of the carcass structure building line 100 also extend substantially along two directions respectively parallel to said axes Y and X.

Preferably, the first path 120 of the carcass structure building line 100 and the first path 220 of the crown structure building line 200 face one another, one in front of the other.

In a preferred embodiment illustrated in FIG. 3, the second path 130 of the carcass structure building line 100 and the second path 230 of the crown structure building line 200 together form an elementary semi-finished products deposition area 600 beyond the third initial location P31 and the first initial location P11.

As schematically illustrated in FIG. 5, the elementary semi-finished products deposition area 600 extends substantially perpendicular with respect to the first path 120 of the carcass structure building line 100 and to the first path 220 of the crown structure building line 200 so as to delimit an inner space 730 where the shaping and assembly station 301 is located.

Preferably, as schematically illustrated in FIG. 5, the first path 120 of the carcass structure building line 100, the first path 220 of the crown structure building line 200 and said substantially perpendicular elementary semi-finished products deposition area 600 overall form a substantially C or U-shaped path.

The bead forming station 140 is preferably arranged at a corner area between the first path 120 and the second path 130 of the carcass structure building line 100.

With respect to the inner space 730 where the shaping and assembly station 301 is located, the storage areas 160, 260 of semi-finished products and the relative feeders 170, 270 are located outside of the first path 120 of the carcass structure building line 100 and of the first path 220 of the crown structure building line 200.

The Applicant considers that the embodiment illustrated in FIGS. 3 and 5, splitting both the building of the carcass structure and the building of the crown structure into two paths, the first using semi-finished products and the second using elementary semi-finished products, at the same time grouping together and suitably arranging the work stations involved in the various steps, advantageously makes it possible to obtain simplicity of layout and of management of the resources used, good accessibility to the work stations, minimization of the building times, number of resources, space and investment required, at the same time making it possible to maintain high performance and technological flexibility at accessible costs. In particular, the use of elementary semi-finished products for building a part of the components of the carcass structure and of the crown structure makes it possible to optimize the finished tyres in terms of performance and technological flexibility. Moreover, the use of semi-finished products for building another part of the components of the carcass structure and of the crown structure makes it possible to simplify the layout and the management of the resources of the plant as well as reduce resources, space and investment required. In addition, the grouping and the arrangement of the work stations involved in the various steps according to a path overall shaped like a C or U advantageously makes it possible to delimit the inner space 730 in which an operator in charge of the supervision of the production plant can have good visibility of the various work stations involved. Moreover, the overall C or U-shaped path makes it possible to optimize the management of the resources used (like, for example, reels of semi-finished products, containers of materials constituting the elementary semi-finished products, dispensers of elementary semi-finished products, bead cores etc.) separating them and grouping them by type in the various building paths. In particular, the reels of semi-finished products 160 for building a first part of components of the carcass structure and the bead cores 150 for the formation of the beads can be grouped and stored along the first path 120 of the carcass structure building line 100, the reels of semi-finished products 260 for building a first part of components of the crown structure can be stored along the first path 220 of the crown structure building line 200, whereas the containers 190, 290 of materials constituting the elementary semi-finished products with the relative dispensing devices 180, 280 can be grouped and arranged along the elementary semi-finished products deposition area 600 formed by the second path 130 of the carcass structure building line 100 and by the second path 230 of the crown structure building line 200. Such a separation makes it possible to provide dedicated corridors separated by type of resource and to facilitate the access to the aforementioned resources and the management thereof, for example in the case in which it is necessary to replace the reels of semi-finished products and/or the containers of materials constituting the elementary semi-finished products for producing tyres of different sizes and/or different structural components.

The invention claimed is:
1. A plant for building tyres for vehicle wheels, comprising:
   a crown structure building line for building crown structures on respective second stage forming drums, said crown structure building line comprising
      a first path, which starts in a first initial location and ends in a first final location, for building a first part of components of the crown structure, the first part comprising at least one belt layer, and
      a second path, which starts in a second initial location and ends in a second final location, passing through a first intermediate location and a second intermediate location, for building a second part of components of the crown structure, the second part comprising at least a tread band;
   a carcass structure building line for building carcass structures on respective first stage forming drums from a third initial location to a third final location, passing through a third intermediate location;
   a shaping and assembly station comprising a first loading/unloading device, a second loading/unloading device and a shaping and assembly machine with a shaping drum;
   a first manipulator having a working area inside which the second initial location, the second final location, the first intermediate location and the second intermediate location of the second path of the crown structure building line and the first loading/unloading device are located; and
   a second manipulator having a working area inside which the third final location and the third intermediate location of the carcass structure building line and the second loading/unloading device are located,
wherein:
   the first manipulator is configured to
      transfer the second stage forming drums, carrying respective crown structures being processed, from the second initial location to the first intermediate location of the second path of the crown structure building line, and
      manage the second stage forming drums arriving into the second intermediate location, carrying the respective crown structures, by delivering the crown structures to the first loading/unloading device and the respective second stage forming drums to the second final location; and
   the second manipulator is configured to manage the first stage forming drums arriving into the third intermediate location, carrying the respective carcass structures, by delivering the carcass structures to the second loading/unloading device and by bringing the respective first stage forming drums to the third final location.

2. The plant according to claim 1, wherein the first manipulator is a non-anthropomorphic Cartesian robot with at least five degrees of freedom to allow movement of said second stage forming drums along three Cartesian axes and a rotation about two of said Cartesian axes.

3. The plant according to claim 2, wherein the first path and the second path of the crown structure building line extend substantially along two directions respectively parallel to two of three of said Cartesian axes.

4. The plant according to claim 1, wherein the second manipulator is a non-anthropomorphic Cartesian robot with at least five degrees of freedom to allow movement of said first stage forming drums along three Cartesian axes and a rotation about two of said Cartesian axes.

5. The plant according to claim 4, wherein the first path and the second path of the carcass structure building line extend substantially along two directions respectively parallel to two of three of said Cartesian axes.

6. The plant according to claim 1, wherein the first path of the crown structure building line comprises at least one work station configured to build the first part of components of the crown structure through deposition of semi-finished products.

7. The plant according to claim 1, wherein the second path of the crown structure building line comprises at least one work station configured to build the second part of components of the crown structure through deposition of elementary semi-finished products.

8. The plant according to claim 1, wherein the carcass structure building line comprises a first path, which starts in said third initial location, for building a first part of components of the carcass structure, comprising at least one carcass ply.

9. The plant according to claim 8, wherein the carcass structure building line comprises a second path, which ends in said third final location, passing through said third intermediate location, for building a second part of components of the carcass structure, comprising at least one among an anti-abrasive insert and a portion of sidewalls.

10. The plant according to claim 9, wherein the carcass structure building line also comprises a bead forming station between the first path and the second path of the carcass structure building line to carry out, on said first stage forming drums, engagement of axially opposite ends of the respective carcass structure being processed with respective annular anchoring structures.

11. The plant according to claim 9, wherein the second path of the carcass structure building line comprises at least one work station adapted to build the second part of components of the carcass structure through deposition of elementary semi-finished products.

12. The plant according to claim 9, wherein the second path of the crown structure building line and the second path of the carcass structure building line together form an elementary semi-finished products deposition area.

13. The plant according to claim 12, wherein said elementary semi-finished products deposition area extends substantially perpendicular to the first path of the crown structure building line and to the first path of the carcass structure building line to delimit an inner space in which the shaping and assembly station is located.

14. The plant according to claim 8, wherein the first path of the carcass structure building line comprises at least one work station adapted to build the first part of components of the carcass structure through deposition of semi-finished products.

15. The plant according to claim 1, further comprising a first translating support configured to transfer said second stage forming drums from said first intermediate location to a first seat of the second path of the crown structure building line, which is located outside of said working area of the first manipulator.

16. The plant according to claim 15, further comprising a second translating support configured to transfer said second stage forming drums from a second seat of the second path of the crown structure building line, which is located outside of said working area of the first manipulator, to said second intermediate location.

17. The plant according to claim 16, further comprising a third translating support configured to transfer said first stage forming drums from a third seat of the second path of the carcass structure building line, which is located outside of said working area of the second manipulator, to said third intermediate location.

18. The plant according to claim 1, wherein the first path of the crown structure building line comprises a plurality of work stations arranged in sequence between two ends of said first path and a mobile shuttle configured to move said M second stage forming drums among said plurality of work stations.

19. The plant according to claim 18, wherein at one of the two ends of the first path of the crown structure building line a loading/unloading station is located, coinciding with the first initial location that, in turn, coincides with the first final location.

* * * * *